UNITED STATES PATENT OFFICE.

DAVID M. CAMPBELL, OF BROOKLYN, NEW YORK.

ALUMINUM-SOLDER.

1,273,146.  Specification of Letters Patent.  Patented July 23, 1918.

No Drawing.  Application filed August 22, 1917.  Serial No. 187,580.

*To all whom it may concern:*

Be it known that I, DAVID M. CAMPBELL, a citizen of the United States, and a resident of the city of New York, borough of Brooklyn, in the county of Kings and State of New York, have invented a new and Improved Aluminum-Solder, of which the following is a full, clear, and exact description.

The object of the invention is to provide an alloy in the shape of a bar which will solder aluminum articles by a soldering iron or braze them by means of a torch.

The alloy which can be applied with an ordinary soldering iron I call the soft aluminum solder; and the one which requires firing with a torch I call the hard solder. The difference is only in the proportions of certain of the ingredients used in the make-up of the alloy. The alloy, whether applied with a soldering iron or with a torch, binds the aluminum parts together without any preheating of the parts.

The solder alloy is formed of copper, aluminum, lead, tin, and zinc. The lead and aluminum are melted first, for they will withstand heat without burning. To this bath the tin is added, and when it is melted the zinc is added, and then the copper, which copper must be soft and refined. The entire bath is thoroughly mixed and then molded into bars as soon as possible without letting the molten bath stand over the fire, for it has a tendency to burn out and lose in strength.

To make the soft solder alloy the proportions by weight are as follows:

| | | | |
|---|---|---|---|
| Copper | 4 parts | or | 7.14% |
| Aluminum | 4 " | or | 7.14% |
| Lead | 8 " | or | 14.30% |
| Tin | 16 " | or | 28.60% |
| Zinc | 24 " | or | 42.82% |

In the hard solder the proportions by weight are as follows:

| | | | |
|---|---|---|---|
| Copper | 16 parts | or | 6.87% |
| Aluminum | 24 " | or | 10.30% |
| Lead | 30 " | or | 12.88% |
| Tin | 48 " | or | 20.60% |
| Zinc | 115 " | or | 49.35% |

The hard solder is used with a blow pipe or torch when welding heavy aluminum or castings of aluminum. The soft solder can be used for soldering light and heavy material in a manner similar to the ordinary way of soldering.

This solder, when used for uniting aluminum objects, gives a smooth finish and has the appearance of aluminum, so that the junction with the object is not easily detected.

It will be noted that to increase the hardness of the solder the amount of copper is decreased slightly over that used in the soft solder, also, the amount of tin is decreased about one and one-half times that used in the soft solder. The amount of zinc is slightly increased. It will be noted that in both alloys the amount of zinc does not exceed 50% and that the amount of aluminum and lead is slightly altered. The hardness of the soft alloy can be varied by changing the quantity of the ingredients from that given for the soft to that given for the hard, and thereby obtaining solder of any desired hardness.

In view of the above it will be seen that many changes in the proportions of the ingredients can be made to suit the conditions, and, therefore, I do not want to be limited to the exact proportions given.

I claim:

1. An aluminum solder consisting of copper, from six to eight per cent.; aluminum, from seven to eleven per cent.; lead, from twelve to fifteen per cent.; tin, from twenty to thirty per cent.; and zinc, from forty to fifty per cent.

2. An aluminum solder comprising copper, from six to eight per cent.; aluminum, from seven to eleven per cent.; lead, from twelve to fifteen per cent.; tin, from twenty to thirty per cent.; zinc, from forty to fifty per cent.; and characterized by a melting point substantially that of solder, so that the same can be worked with a soldering iron.

DAVID M. CAMPBELL.